Patented Nov. 2, 1948

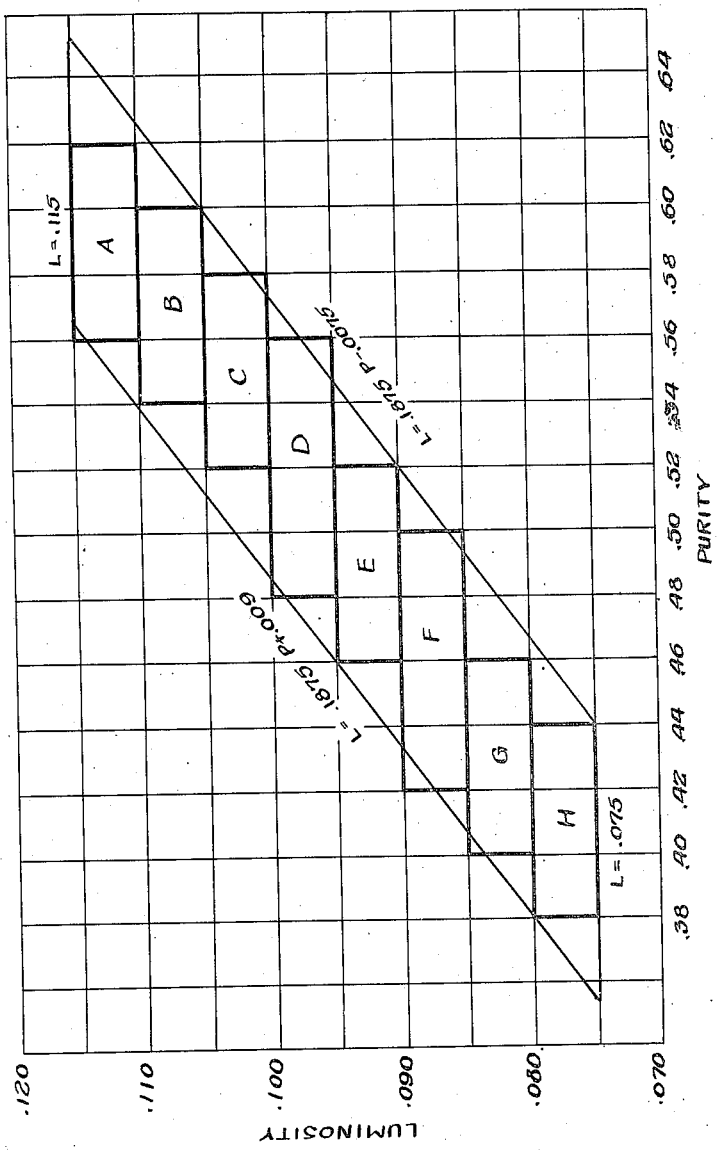

2,452,608

UNITED STATES PATENT OFFICE 2,452,608

IRON OXIDE PIGMENTS AND METHOD OF PRODUCING THE SAME

George B. Smith, Evanston, Ill., assignor to Minnesota Mining & Manufacturing Company, St. Paul, Minn., a corporation of Delaware Application May 29, 1941, Serial No. 395,763

9 Claims. (Cl. 106—304)

This invention relates to the manufacture of iron oxide, particularly for use as a pigment, for a rouge for polishing glass, and for other uses. The invention is particularly concerned with the production of iron oxide pigments of various colors and shades; an important feature of the invention being the fact that the shade of the pigment may be predetermined by the choice of iron ore or ores employed as the starting materials.

A principal object of one embodiment of the invention is the production of iron oxide pigments having a low apparent density, such as 40–80% of the apparent density of the original ore, a high tinting strength, brilliant shades and bright tones of predetermined quality by the treatment of iron ores. A feature of the invention is the production of iron oxide pigments having the foregoing highly desirable characteristics by the use of methods and starting materials more economical than those previously employed in the commercial production of iron oxide pigments. A further embodiment of the invention contemplates the still more economical production of iron oxide pigments of slightly lower quality than produced by the preferred method, in that, while bright tones and brilliant shades are obtained, their apparent density is not as low nor is the tinting strength as high as in the products of the preferred method.

Iron oxide pigments customarily are made commercially by roasting copperas (ferrous sulphate) or by calcining ferrite yellow, an intermediate pigment made from copperas and/or scrap iron. In my improved method I preferably employ an iron ore as the base for the production of iron oxides of the type described. For example, to obtain a brilliant orange pigment, a red hematite ore such as M & B No. 1 from Potosi, Missouri, or a Susquehanna limonite ore, from Hibbing, Minnesota, may be employed. Such ores contain approximately 50–90% iron oxide ($Fe_2O_3$). To obtain an intermediate shade, the starting material is preferably a hematite such as ore obtained from the Negaunee range. To obtain a reddish purple pigment, the starting material is preferably a naturally occurring hematite, for example, Cleveland Cliffs shaft ore. To obtain a medium Indian red pigment, my preferred starting material is a purple hematite iron ore such as can be obtained from the Missouri or Cambridge ranges, although pyrites cinder may be employed when available. A feature of the invention, therefore, is the obtaining of any of the red shades employed commercially in iron oxide pigments without the addition of tone controllers, such as caustic soda, sodium chloride, ammonium sulphate and the like, by the selection of the proper iron ore as the starting material; the method of treatment of various iron ores being essentially the same for all of them. A complete range of shades of iron oxide pigments can be manufactured by my process, the proper selection of the iron ore being the primary medium of shade control. It has been observed in many instances that there appears to be more than a superficial resemblance between the shade of the ore used and the color of the iron oxide pigment produced, but there are many notable exceptions, such as some of the Minnesota hematites which show reasonably normal shades as untreated ores go but yield finished products which could not be classified as red iron oxide pigments. Many of these ores, when treated within the scope of my invention, yield brown pigments of great commercial interest, but the shades produced cannot readily be predicted with finality by a simple visual inspection of the ores. Minor variations in shade may be obtained by varying the time and temperature of calcining.

The manufacture of brown pigments mentioned above constitutes one embodiment of this invention. For the production of these colors I may use hematite ores from Missouri or Minnesota which have a relatively high manganese content.

The invention includes the step of first converting, under controlled conditions, a substantial portion of the iron content of the ore being treated to ferric sulphate. While the conversion of a portion of the iron content of iron ores to ferric sulphate by reacting it with sulphuric acid is known to the art, as exemplified by the U. S. patent to Ledoux No. 360,967, such methods have not been commercially feasible or successful in the production of pigments for two principal reasons: First, it was not known or disclosed by Ledoux that a complete range of shades of iron oxide pigment could be prepared by selecting the proper iron bearing raw materials and, second, operating under the conditions specified by Ledoux, only a relatively small portion of the iron content of the ore is converted to ferric sulphate and these grossly incomplete conversions, when roasted, yield pigments of high apparent density and low tinting strengths and containing relatively large proportions of unchanged ore which at best act only as diluents and often cause difficulty with hard settling when used in paints. As will be more fully brought out hereinafter, the conditions under which the conversion to ferric sulphate in my improved method takes place are carefully controlled to carry the reaction substantially to completion within the limits of the reagents employed and to produce a granular material which is easily handled and calcined.

In employing iron ore as the starting material, the ore is ground and placed in a conventional internal mixer which is used as the converter. It is important that the converter be suitably insulated and closed to the atmosphere so that the high temperature resulting from the dilution of the acid and exothermic dissolution of the ore will be maintained as hereinafter described. Concentrated sulphuric acid is then added to the ore in the converter and after it is thoroughly mixed, water is added and the converter closed. If desired, the water may be mixed with the iron ore before the sulphuric acid is added but for mechanical reasons, such as the formation of a better slurry, it is preferred to mix the acid with the ore first. The reaction between the iron oxide and sulphuric acid begins almost immediately due to the heat of dilution of the acid; if water at temperatures somewhat above room temperature is employed, the reaction begins sooner.

The reaction is quite turbulent and violent and the mass liquefies, boils and expands in volume, and generates considerable heat which tends to accelerate and maintain the reaction. If the heat generated by the exothermic nature of the reaction is dissipated and lost rapidly, the reaction is short lived and is not carried to completion. It is important, therefore, that the heat generated by the reaction be retained within the converter insofar as possible in order that a high reacting temperature is maintained and the reaction is carried substantially to completion within the limits of the less than stoichiometric proportions of the reactants present. If the reaction is carried on for only a short time, converting only a small portion of the iron content of the ore to ferric sulphate, the partially converted mass does not become granular and is difficult to handle, and a high-grade final product having a low apparent density and high tinting strength is not obtained. The converter is preferably provided with a pop-off valve or a vent to prevent the pressure from rising substantially above atmospheric. After the reaction is completed and before the material has cooled and become granular, the batch is emptied from the converter into a container, where it cools and becomes a granular solid which is readily removed from the container, due to the granular nature of the material largely comprising ferric sulphate.

Operating under the conditions described, approximately 80% of the iron content of the ore is converted to ferric sulphate. While the percentage of the iron of the ore that is converted will vary for various reasons such as the different types of iron ore treated, the construction of the converter employed and the effectiveness of insulation, it is essential, to obtain a high-grade iron oxide pigment, that upwardly of 70% of the iron content of the ore be converted to ferric sulphate. Generally iron ore will average about 80 to 90% iron in terms of $Fe_2O_3$ and 15% impurities which may include silica, alumina, manganese, calcium, magnesium, etc., although obviously these proportions will vary depending upon the source of the ore. To convert substantially all of the iron in a ton of such an iron ore to ferric sulphate requires about 1.7 tons of sulphuric acid of 66° Baumé. These proportions of the reactants are not usually recommended due to the unnecessarily large amount of acid employed, and I generally prefer to operate below the stoichiometric proportion of sulphuric acid set forth above. When the reaction carried out under the prescribed conditions is completed, the material is granular in form, and is composed largely of ferric sulphate, smaller proportions of unconverted iron, and yet smaller proportions of silica, alumina, etc.

The material may then be disintegrated or screened and introduced into a roasting furnace either of the rotary type, continuous belt type, semi-muffle type, closed muffle type or reverberatory type and roasted for predetermined periods at predetermined temperatures depending upon the exact shade of the resultant iron oxide pigment desired.

Considering now the details of the process, the iron ore is first dried and then ground until approximately 99% of it will pass through a 100 mesh screen. Hard ores, such as shaft ores, should be ground finer so that substantially all of it will pass a 300 mesh screen, while soft spongy ores, such as Cambridge ores, need only be ground to pass a 40 or 50 mesh screen. The difference in fineness to which different ores need be ground is due to the difference in the ease with which they are attacked by the acid. In a relatively small scale operation, 200 pounds of ground iron ore are placed in an insulated internal mixer and throughly mixed with approximately 280 pounds of concentrated sulphuric acid, preferably of 66° Baumé. One hundred fifty pounds of water, which may be at room temperature or warmer (if warm water is employed, the reaction commences sooner) is then rapidly added and mixed with the sulphuric acid and iron ore. The addition of the water results in a dilution of the concentration of the original acid to yield an acid having a content of 60.5% $H_2SO_4$; that is, the diluted acid has a gravity of about 48.5° Baumé and, on a weight basis, is made up predominantly of $H_2SO_4$.

A considerable variation in the conditions and time of the conversion process is allowable within the embodiments of my invention. In order to obtain the best pigment properties in the final product, particularly as regards tinting strength and apparent density, it is necessary that a major portion of the iron in the ore be converted to ferric sulphate. In using ore-to-acid ratios such that the acid could combine with about 80% of the iron to form ferric sulphate, it has been found that this reaction is approximately completed in fifteen to twenty minutes if the conditions are such that the reaction mixture remains substantially at the boiling point, about 270° F., for approximately the entire time. When conversions of this type cool and solidify, they are rather hard and not too easily granulated to a form suitable for roasting, although reasonably satisfactory pigments can be made from them. In such conversions the batches are usually small, utilizing about 200 pounds of ore per batch. When such batches are converted in suitable small containers such as an internal mixer, it is vital that the walls and bottom of the mixer be well insulated and that it be covered during the conversion to prevent any cooling that might take place by aeration and evaporation over and above that which takes place as actual boiling. The process may be still further improved if a tight-fitting cover is employed so that an actual positive pressure can be maintained within the converter, thus raising the boiling point, the temperature and the reaction rate.

While conversions of this type will make satisfactory products as pointed out above, the process may be still further improved by holding the conversion at the elevated temperature for a still longer length of time. I have found that this can be readily accomplished by increasing the size of the conversion batch, utilizing, for example, 2500 pounds of ore with acid and water in the proportions previously set forth. Such a conversion is readily accomplished in a cylindrical wooden tank which may be constructed of 3″ cypress staves and equipped with a suitable agitator. With such a tank suitably covered to exclude any aeration but with no effort to hold the pressure above atmospheric, the temperature will remain at the reacting point for several hours. At the end of this period, the mixture is still fluid and can be discharged into a suitable container wherein it solidifies into a granular form which is relatively ideal for the subsequent roasting process.

The converted and disintegrated material is then placed in a roasting furnace of the type described and calcined at temperatures of approximately 1100° F. to approximately 1800° F. to convert the ferric sulphate to iron oxide. For example, employing a 50-foot rotary kiln, the converted material composed largely of ferric sulphate may be roasted for one hour at approximately 1600° F. The fine control of color is governed by the temperature of calcination, higher temperatures giving a bluish cast to the different shades of red iron oxide produced from various ores in accordance with the method described.

For the production of pigments in which low apparent density and high tinting strength are not required, my improved method may be employed with considerable saving of the amount of acid consumed over the methods known to the art to obtain an iron oxide pigment having brilliant shades of predetermined color from various iron ores. In this embodiment of the invention, I prefer to employ from 100 to 125 pounds of sulphuric acid of 66° Baumé with 200 pounds of ground iron ore, since substantially smaller proportions of acid will objectionably affect the color. The ore and acid are thoroughly mixed and 60 pounds of water are then added. The reaction is carried on in the same equipment and in substantially the manner previously described. The reaction requires approximately the same periods of time as when larger amounts of acid are employed, and when completed in the manner described produces a granular material. When 200 pounds of ground iron ore are treated with 100 pounds of sulphuric acid, or in larger batches employing approximately the same ratio of materials, approximately 30% of the iron in the ore is converted to ferric sulphate. When 200 pounds of ground iron ore is treated with 125 pounds of concentrated sulphuric acid, approximately 35 to 40% of the iron in the ore is converted to ferric sulphate. The material is then disintegrated to a suitable size for calcination and roasted as described above to form an iron oxide pigment.

As previously set forth, pigments produced in accordance with the foregoing methods possess brilliant shades and bright tones and the pigments produced following the preferred embodiment of the method, in which relatively high acid concentrations are employed, also have a low apparent density and high tinting strength. The color characteristics of iron oxide pigments so produced may be more specifically defined by methods well established in the pigment art, by the properties purity, dominant wave length and luminosity. In making these color measurements, the pigments are first used to pigment lacquers which are otherwise substantially colorless, and the resulting surface coating materials are applied to flat wood or metal panels yielding finishes which are low in gloss and which show the color characteristics of the pigments employed in their preparation. Spectrophotometric measurements are then made of these coated panels and the data so obtained are used to compute the luminosity, purity and dominant wave length as described in Hardy's "Handbook of Colorimetry," published by the Massachusetts Institute of Technology. When these color computations are made, it is necessary to specify the illuminant under which the colored panel is assumed to be viewed. The most common illuminant and the one which I have used throughout, is known to the art as I. C. I. illuminant C.

The numerical characterizations of the products which are manufactured within the scope of my invention are illustrated in the accompanying graph. In this figure luminosity is plotted against purity and it will be seen that the points of interest in this connection all fall within the area bounded by the lines represented by the equations $L=.1875\ P+.009$, $L=.115$, $L=.1875\ P-.0075$, and $L=.075$. In such a range of pigments, the dominant wave length may vary between 599 millimicrons and 605 millimicrons. This characteristic is one the specification of which is not vital to my invention. The exact dominant wave length of a given red iron oxide pigment is substantially fixed by the luminosity-purity group into which the pigment falls and by the fact that the pigment is iron oxide.

When M & B No. 1 ore is used as the starting material and treated according to the preferred embodiment of my invention, the luminosity is 0.11 and the purity is 0.565 when determined as set forth above. This is a very light, brilliant orange shade which may be regarded as one of the lighter shades which is commonly prepared within the embodiments of my invention.

To obtain a shade at the other extreme, I may use a purple hematite such as can be obtained from the Missouri or Cambridge ranges or a pyrites cinder, and a pigment prepared from such a starting material has a luminosity of 0.077 and a purity of 0.395. This is a pigment of a brilliant attractive shade in the so-called Indian red class.

To obtain an intermediate shade, I may use a Negaunee hematite which yields a pigment having a luminosity of 0.098 and a purity of 0.505.

For shades intermediate between those mentioned, I may select other ores or use blends of the ores mentioned. For example, to obtain a luminosity between 0.100 and 0.105 and a purity between 0.52 and 0.58, this area being designated C on the graph, I may use a mixture of approximately equal proportions of the M & B No. 1 and the Negaunee hematite. In a similar fashion, an ore mixture of approximately one part Negaunee hematite and three parts of a purple hematite or pyrites cinder yields a pigment with luminosity between 0.090 and 0.095 and a purity between 0.46 and 0.52, area E on the graph, while a mixture of equal parts of these ores yields a pigment of luminosity between 0.085 and 0.090 and a purity between 0.42 and 0.50, area F, while, finally, a mixture of approximately three parts of the former and one part of the latter ores yields a pigment with a luminosity between 0.80 and 0.085 and a purity between 0.40 and 0.46, area G.

Mention has also been made of the relatively high tinting strength of the pigments which I am able to produce. Beside being used as the major pigmenting material in a paint or lacquer film, my products are also used in relatively minor proportions in otherwise white paints to produce desirable tints. It is obvious that the proportion of the colored pigment required to produce a given tint is a measure of the value of the colored pigment when used for this purpose. As a relative measure of the tinting strength of a pigment, it is common practice to prepare a paint or lacquer finishing material containing green seal zinc oxide, which is white, to which is added a relatively small amount of the iron oxide pigment, commonly in such proportions that the ratio of ZnO to $Fe_2O_3$ is 20 to 1. The luminosity of a film of such a lacquer is then a measure of the tinting strength of the iron oxide pigment, the stronger pigments yielding the lower luminosities. Thus, with pigments manufactured according to my invention those yielding tints having dominant wave lengths greater than 580 millimicrons, which includes the group which are predominantly reddish, a lacquer film so prepared will have a luminosity no greater than 0.25, while, when the dominant wave length is no greater than 520 millimicrons, which includes the group of pigments having a bluish cast, the luminosity will be not greater than 0.265.

What I claim is:

1. The method of producing an iron oxide pigment comprising mixing ground iron ore having an iron content of at least about 80% in terms of $Fe_2O_3$ with concentrated sulphuric acid of at least about 66° Baumé and in an amount less than the stoichiometric amount of said acid required to convert all of the iron oxide content of the ore to ferric sulphate, but in an amount sufficient to convert at least about 70% of said iron oxide content to ferric sulphate, continuing the reaction between said iron and said acid by conserving within the reactants sufficient heat given off by the exothermic nature of said reaction so as to maintain said reactants at an elevated temperature of the general order of 240°–270° F. and so as to form a reaction product which is fluid enough at said elevated temperature so that it can be discharged as a fluid from the reaction zone and will form a granular sensibly dry material upon cooling, and then calcining such material to convert the ferric sulphate to $Fe_2O_3$ and to form an iron oxide pigment.

2. The method of producing an iron oxide pigment of any desired shade within the color range of pigments composed essentially of iron oxide, comprising mixing an iron ore or blend of iron ores having an iron content of at least about 80% in terms of $Fe_2O_3$ and adapted to produce a shade within the desired range desired with concentrated sulphuric acid to convert upwards of 70% of the iron content thereof to ferric sulphate, said sulphuric acid having a concentration of at least about that of 66° Baumé sulphuric acid and being present in the stoichiometric proportion necessary to convert at least 80% of the iron content of said ore to ferric sulphate, continuing the reaction between the iron content of the ore and the sulphuric acid at an elevated temperature by conserving the heat given off by the exothermic reaction until upwards of 70% of the iron content of the ore is converted to ferric sulphate and a product is formed which is still fluid enough at said elevated temperature that it can be discharged as a fluid from the reaction zone and upon cooling will solidify to form a granular material, and then roasting the converted, granular material at temperatures between 1100° F. and 1800° F. to obtain the desired minor variation in shade.

3. The method of making red iron oxide pigment of controlled shade and tone of color and of good tinting value which comprises selecting an iron oxide material of predetermined character, and which has an iron content of about 80% to 90% in terms of $Fe_2O_3$ and contains a small percentage of non-ferrous metal material, mixing said oxide material with concentrated sulphuric acid of about 66° Baumé, the acid being present in relation to the iron content of said oxide material in an amount sufficient to convert at least about 80 percent of the said iron content to ferric sulphate, then diluting the resulting mixture in a reactor with a lesser but substantial amount of water in relation to said acid, whereupon the temperature of the mixture rises and the reaction between the iron oxide and the sulphuric acid begins, conserving the exothermic heats of dilution and reaction so as to maintain the said mixture at an elevated temperature of about 240° F. but not greater than the boiling point of the mixture for a period sufficient so that at least about 80 percent of the iron content of said iron oxide material is converted to iron sulphate and the mass is of quite uniform composition and is still fluid at the elevated temperature aforesaid, then discharging the resulting fluid mass from the reactor and allowing it to solidify, and then roasting the resulting solid so as to convert the iron sulphate to $Fe_2O_3$ and to form a pigment product of the desired shade and characteristics.

4. The method of producing a red iron oxide pigment product of predetermined shade within the range of those having a luminosity of 0.11 and a purity of 0.565 and those having a luminosity of 0.077 and a purity of 0.395, which comprises selecting two widely different iron oxide materials from the group consisting of iron ores and other iron-bearing material of high iron content, blending said materials together in predetermined desired ratio, in the range of more than zero and less than 100 percent of one to less than 100 percent and more than zero percent of the other, to provide a predetermined starting material depending upon the predetermined shade of pigment product desired, said starting material being further characterized in that it has an iron content in terms of $Fe_2O_3$ of at least about 80 percent; reacting said starting material with sulphuric acid of concentration such as to be made up predominantly of $H_2SO_4$ and in stoichiometric proportion sufficient to convert upwards of 70 percent of the iron content thereof to ferric sulphate, the iron content of said starting material and the concentration of said acid being so related in any case as to yield a reaction product which is fluid at the elevated temperature of reaction but will form a solid upon cooling to room temperatures; then removing said reaction product from the reaction zone and cooling the same to approximately room temperatures to solidify it; and then calcining the solidified reaction product to convert said ferric sulphate to $Fe_2O_3$ and to produce the red iron oxide pigment product of the desired shade aforesaid.

5. The method of producing iron oxide pigments which comprises mixing ground iron oxide material having an iron content of at least about 80% in terms of $Fe_2O_3$ and sulphuric acid, said acid having a concentration of at least about that of 66° Baumé sulphuric acid and being present in the stoichiometric proportion sufficient to convert at least 70% of the iron content of said iron oxide material to ferric sulphate, adding water to said mixture to start a reaction resulting in the formation of ferric sulphate by the heat of dilution of the acid, maintaining the reactants at a temperature upwardly of 240° F. by conserving the heat given off by the exothermic nature of said reaction, without the addition of external heat to carry on the reaction until at least 70% of the iron content of the iron oxide material is converted to ferric sulphate and a material is obtained which is fluid enough at the aforesaid elevated temperature so that it can be discharged as a fluid from the reaction zone and upon cooling to room temperatures will form a granular solid which is sensibly dry, and then roasting the said granular solid to convert the ferric sulphate thereof to $Fe_2O_3$ and to form an iron oxide pigment product of desired shade and characteristics.

6. The method of treating an iron oxide material to make a red iron oxide pigment product of reduced apparent density and of increased tinting strength, and also of controlled shade, which comprises selecting an iron oxide material having an iron content of about 80%–90% in terms of $Fe_2O_3$, reacting said iron oxide material with sulphuric acid of concentration such as to be made up preponderantly of $H_2SO_4$ and in sufficient amount stoichiometrically to convert upwards of 70% of the iron content of said oxide material to ferric sulphate, reacting said oxide material and said sulfuric acid at elevated temperatures of the general order of 240°–270° F. so that at least about 70% of the iron content of the oxide material is converted to iron sulphate, the iron content of said oxide material and the concentration of said acid being so related in any particular case that a reaction product is obtained which is fluid enough at said elevated temperature that it can be discharged as a fluid from the zone of reaction and, upon cooling to room temperatures, becomes a solid which will hold its form so that it can be handled and calcined; then discharging the resulting fluid reaction product from the zone of reaction aforesaid and allowing it to cool and solidify; and then roasting the resulting solid so as to convert the iron sulphate to $Fe_2O_3$ and to form a pigment product of desired shade and of low apparent density and high tinting strength.

7. The method of treating an iron ore to make a red iron oxide pigment of controlled shade and good tinting strength which comprises selecting an iron ore having an iron content of at least 80% in terms of $Fe_2O_3$, reacting said iron ore at elevated temperature with sulphuric acid of concentration such as to be made up preponderantly of $H_2SO_4$ and in sufficient stoichiometric amount, depending upon its concentration, so that at least 80% of the iron content of the ore is converted to iron sulphate, the iron content of said ore and the concentration of said acid being so related in any case that the reaction product obtained is fluid enough at said elevated temperature that it can be discharged as a fluid from the reaction vessel and upon cooling to room temperatures becomes a solid which will hold its form and can be handled and calcined; allowing said reaction product to cool and form such a solid; and then calcining said solid at roasting temperatures to convert the iron sulphate to $Fe_2O_3$ and to produce a pigment product of controlled shade and tone of red color and of good tinting strength.

8. The method of making red iron oxide pigment of controlled shade and tone of color and of high oil absorption which comprises employing a predetermined raw iron oxide material which has an iron content of at least about 80% in terms of $Fe_2O_3$ and contains a minor amount of non-ferrous metal material, treating and reacting said material at elevated temperatures with sulphuric acid of concentration such as to be made up preponderantly of $H_2SO_4$ and in stoichiometric amount sufficient to convert upwards of 70% of the iron oxide content of said material to ferric sulphate, the iron content of said oxide material and the concentration of said acid being so related that the reaction product thus produced is a fluid at the said elevated temperatures of reaction and upon cooling to room temperatures becomes a solid, and thereafter heating and agitating the resulting sulphate-bearing product at a roasting temperature to convert said ferric sulphate substantially completely to $Fe_2O_3$ and to produce a red iron oxide pigment product, said red iron oxide pigment product having substantially the same chemical composition of the said raw iron oxide material but being of different shade of color, tinting strength and oil-absorption than said raw iron oxide material, the shade and tone of said red iron oxide pigment product being influenced and controlled to substantial extent by said non-ferrous metal material.

9. The method of producing a red iron oxide pigment product of controlled shade and tone which comprises mixing together a plurality of iron ores to provide a desired predetermined starting material which has an iron content of at least about 80% in terms of $Fe_2O_3$, reacting said starting material at elevated temperatures with sulphuric acid of concentration such as to be made up preponderantly of $H_2SO_4$ and in stoichiometric amount sufficient to convert upwards of 70% of the iron content of said starting material to ferric sulphate, so as to produce a product composed largely of ferric sulphate, the iron content of said starting material and the concentration of said acid being so related in any case that the reaction product is fluid at the said elevated temperatures of reaction but will solidify upon being withdrawn from the reaction zone and cooled to ordinary room temperatures; and thereafter roasting said product in the form of solid particles to change the ferric sulphate to $Fe_2O_3$ and to produce the desired pigment product of said controlled shade and tone, the said shade and tone resulting from the use of said predetermined starting material.

GEORGE B. SMITH.

REFERENCES CITED

The following references are of record in the file of this patent:

UNITED STATES PATENTS

| Number | Name | Date |
| --- | --- | --- |
| 360,967 | Ledoux | Apr. 12, 1887 |

Certificate of Correction

Patent No. 2,452,608. November 2, 1948.

GEORGE B. SMITH

It is hereby certified that errors appear in the printed specification of the above numbered patent requiring correction as follows:

Column 7, line 4, for "0.80" read *0.080*; line 67, claim 2, before "with" strike out the word "desired";

and that the said Letters Patent should be read with these corrections therein that the same may conform to the record of the case in the Patent Office.

Signed and sealed this 1st day of March, A. D. 1949.

[SEAL]

THOMAS F. MURPHY,
*Assistant Commissioner of Patents.*